United States Patent
Ryan, Jr. et al.

(10) Patent No.: US 7,483,175 B2
(45) Date of Patent: Jan. 27, 2009

(54) METHOD AND SYSTEM FOR PRINTING SECURE VALUE DOCUMENTS AND NON-SECURE DOCUMENTS UTILIZING THE SAME PRINTING DEVICE

(75) Inventors: Frederick W. Ryan, Jr., Oxford, CT (US); Robert A. Cordery, Danbury, CT (US); Donald G. Mackay, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 487 days.

(21) Appl. No.: 11/228,597

(22) Filed: Sep. 16, 2005

(65) Prior Publication Data

US 2007/0062402 A1 Mar. 22, 2007

(51) Int. Cl.
*G06F 15/00* (2006.01)

(52) U.S. Cl. .......................... 358/1.9; 358/1.2; 358/1.6; 399/366; 705/57

(58) Field of Classification Search ................... 358/1.1, 358/1.2, 1.6, 1.9, 3.26, 1.13, 1.15, 3.28, 448, 358/449, 452, 453, 463, 464, 468; 382/135–137; 101/484; 726/26, 32, 33; 380/243, 245; 399/366; 705/51, 57, 408; 713/189
See application file for complete search history.

(56) References Cited

U.S. PATENT DOCUMENTS

| | | | | |
|---|---|---|---|---|
| 5,386,303 | A * | 1/1995 | Kihara | 358/453 |
| 5,483,602 | A * | 1/1996 | Stenzel et al. | 382/135 |
| 5,611,630 | A | 3/1997 | Dolan et al. | |
| 5,798,844 | A * | 8/1998 | Sakano et al. | 358/468 |
| 6,202,092 | B1 * | 3/2001 | Takimoto | 358/1.13 |
| 6,515,755 | B1 | 2/2003 | Hasegawa | |
| 6,533,385 | B1 | 3/2003 | Mackay et al. | |
| 6,612,684 | B2 | 9/2003 | Mackay et al. | |
| 2002/0176114 | A1 | 11/2002 | Zeller et al. | |
| 2003/0052178 | A1 | 3/2003 | Zeller et al. | |
| 2003/0117640 | A1 * | 6/2003 | Parry et al. | 358/1.15 |
| 2003/0156733 | A1 | 8/2003 | Zeller et al. | |
| 2004/0066524 | A1 | 4/2004 | Lay et al. | |
| 2004/0141190 | A1 | 7/2004 | Akashi | |
| 2004/0165211 | A1 * | 8/2004 | Herrmann et al. | 358/1.15 |
| 2005/0071295 | A1 | 3/2005 | Cordery et al. | |
| 2005/0086516 | A1 | 4/2005 | Ueda et al. | |
| 2005/0087605 | A1 | 4/2005 | Auslander et al. | |
| 2005/0117668 | A1 | 6/2005 | Tang et al. | |
| 2005/0120244 | A1 * | 6/2005 | Choi | 713/201 |
| 2005/0127187 | A1 | 6/2005 | Auslander et al. | |
| 2005/0144469 | A1 * | 6/2005 | Saitoh | 713/189 |

(Continued)

*Primary Examiner*—Kimberly A Williams
(74) *Attorney, Agent, or Firm*—Brian A. Lemm; Angelo N. Chaclas

(57) ABSTRACT

A printing system for printing both secure value documents and non-secure documents while ensuring that fraudulent copies of secure value documents printed by the printing system can be detected is provided. The printing system determines if the source is a secure or non-secure source. If the source of the image is a secure source, it will print the image, including any graphic security features. If the source is a non-secure source, before printing the image a filter is applied to the image data to remove any graphic security features included in the received image and/or the printing system will not add any graphic security features to the received image to ensure that the printed image will not contain any copy detection graphic security features.

8 Claims, 3 Drawing Sheets

U.S. PATENT DOCUMENTS

| | | | |
|---|---|---|---|
| 2006/0012805 A1* | 1/2006 | Liu | 358/1.6 |
| 2007/0146768 A1* | 6/2007 | Isoda | 358/1.15 |
| 2007/0146806 A1* | 6/2007 | Ishihara | 358/405 |
| 2007/0242312 A1* | 10/2007 | Tsutsumi | 358/3.28 |
| 2008/0005042 A1* | 1/2008 | Ryan et al. | 705/408 |

* cited by examiner

METHOD AND SYSTEM FOR PRINTING SECURE VALUE DOCUMENTS AND NON-SECURE DOCUMENTS UTILIZING THE SAME PRINTING DEVICE

FIELD OF THE INVENTION

The invention disclosed herein relates generally to printing, and more particularly to methods and systems for printing secure value documents and non-secure documents utilizing the same printer.

BACKGROUND OF THE INVENTION

Secure printing systems are typically used for printing secure value documents, e.g., postage, tickets, money orders, etc. Since such documents may have substantial cash value, there exists a continuing problem of preventing the copying of such documents to generate fraudulent documents. To aid in the detection of copies, graphic security features are introduced into the images, including, for example, watermarks, odd print resolutions, specialized inks, etc. Such security features are difficult, if not impossible, to reproduce with typical "off-the-shelf" printers, scanners or copiers. Thus, the security features enable detection of any copies of such secure value documents that have been printed or reproduced by other devices.

Since the security features enable the detection of copies of the secure value documents, it is necessary to ensure that the secure printing systems themselves cannot be used to print fraudulent images which contain the security features. It is therefore necessary to control the source of the images being printed by the secure printing systems, thereby preventing a dishonest person from providing a fraudulent image, e.g., a counterfeit postage indicium, ticket, money order or the like, to the secure printing system, which will print the security features in the fraudulent image, such that it appears legitimate. As a result, such secure printing systems are single purpose devices, i.e., they can only be used to print value documents from a secure source and cannot be used to print any other types of images. This restriction limits the usefulness of such secure printing systems. For example, a postage label printer may be able to print postage and address information, but can not be used to print corporate logos or product labels since the images could be fraudulent copies of valid postage indicia which would be indistinguishable from original valid postage indicia.

Thus, there exists a need for a printing system that can be used to print both secure value documents and non-secure documents while ensuring that fraudulent copies of secure value documents printed by the printing system can be detected.

SUMMARY OF THE INVENTION

The present invention alleviates the problems associated with the prior art and provides a printing system that can be used to print both secure value documents and non-secure documents while ensuring that fraudulent copies of secure value documents printed by the secure printing system can be detected.

According to embodiments of the invention, the printing system determines if the source of the image is a secure or non-secure source. Optionally, the printing system can also authenticate the source of the image to be printed utilizing, for example, cryptographic techniques or communication protocols. If the printing system is able to determine that the source of the image to be a secure, trusted source, it will print the image, including any graphic security features, thereby rendering any copies of the printed image detectable. The graphic security features may be included as part of the image received from the secure source or added by the secure printing system. If the printing system determines the source is not a secure source, before printing the image a filter is applied to the image data to remove any graphic security features included in the image received from the non-secure source and/or the printing system will not add any graphic security features to the image to ensure that the printed image will not contain any copy detection graphic security features. Thus, even if the image data from the non-secure source is an exact copy of a valid value document, e.g., a postage indicium, the image printed by the printing system will be different from the same image received from a secure source and therefore detectable as a fraudulent copy since it will not have any of the required graphic security features. Alternatively, or in addition to, application of the filter, the printing system can also optionally check that an image received for printing from a non-secure source complies with predetermined restrictions placed on such images. Such restrictions could include, for example, dimensional restrictions, stock restrictions, etc. If the image violates one of the predetermined restrictions, the printer can attempt to modify the image such that it complies with all of the restrictions before printing, thereby changing the image to signify it is not authentic. If the image cannot be modified, the printing system can refuse to print the image. By utilizing the printing system of the present invention, both secure value documents and non-secure documents from different sources can be printed while still ensuring that fraudulent copies of secure value documents can be detected, thereby allowing the printing system to be used for multiple purposes.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
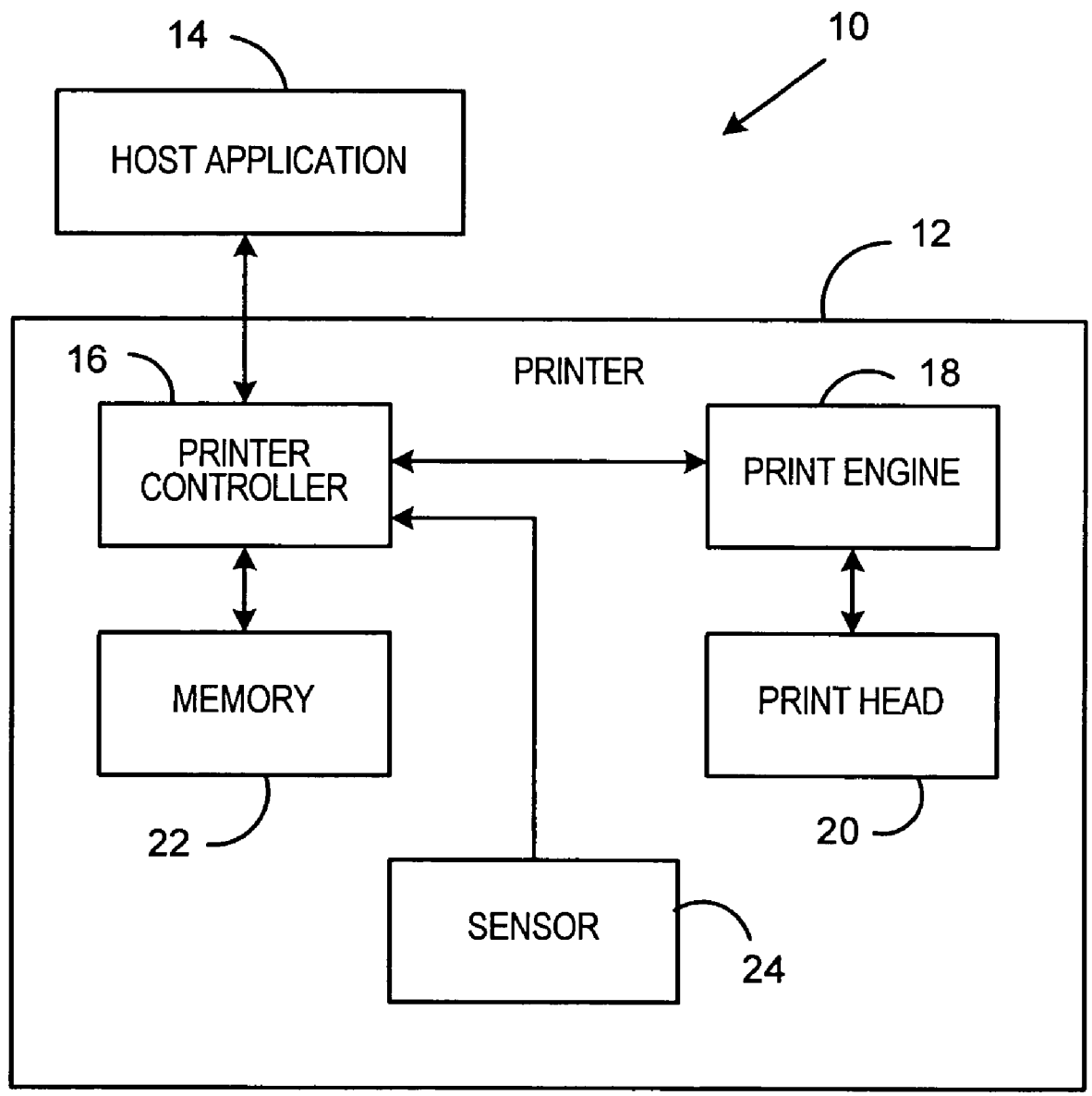
FIG. 1 illustrates in block diagram form a printing system according to an embodiment of the present invention.

In describing the present invention, reference is made to the drawings, where there is seen in FIG. 1 in block diagram form a printing system 10 according to an embodiment of the present invention. Printing system 10 could be, for example, a system for printing postage as well as other images, e.g., corporate logos, product labels, etc. System 10 includes a printer 12 coupled to one or more host applications 14 (only one shown in FIG. 1 for clarity). The host application 14 may or may not be integral to the printer 12. One example of a host application 14 that is not integral with the printer 12 is a personal computer application such as a word processor. One example of a host application 14 that is integral with the printer 12 is a photo printer that allows a user to print images from a digital camera memory card. The printer 12 includes a printer controller 16, such as, for example, a special purpose processor or ASIC, to control operation of the printer 12. A memory device 22 may be provided to store, for example, operating instructions and data, image data, and the like for use by the printer controller 16. The printer controller 16 is coupled to a print engine 18 that controls operation of a print head 20. The printer controller 16 receives image data and optionally print control instruction data (hereinafter referred to collectively as image data) from the host application 14 and generates control signals for printing of the image based on the received image data. The print control instruction data could include, for example, resolution, color depth, selection of ink cartridge for printing, selection of medium upon which printing is to be performed, etc. The image could be, for example, an indicium that evidences payment of postage. Based on the image data, i.e., print control instruction signals, from the printer controller 16, the print engine 18 will control the print head 20 to print the image. The secure printing system 10 may be a single unit or may be implemented as a peripheral device. If implemented as a peripheral device, portions of the host application 14 and printer controller 16 may be implemented in a host computer, such as, for example, a personal computer. Similarly, the host application 14 may further be implemented as a combination of a host computer application and a remote data center application.

Figure 2:
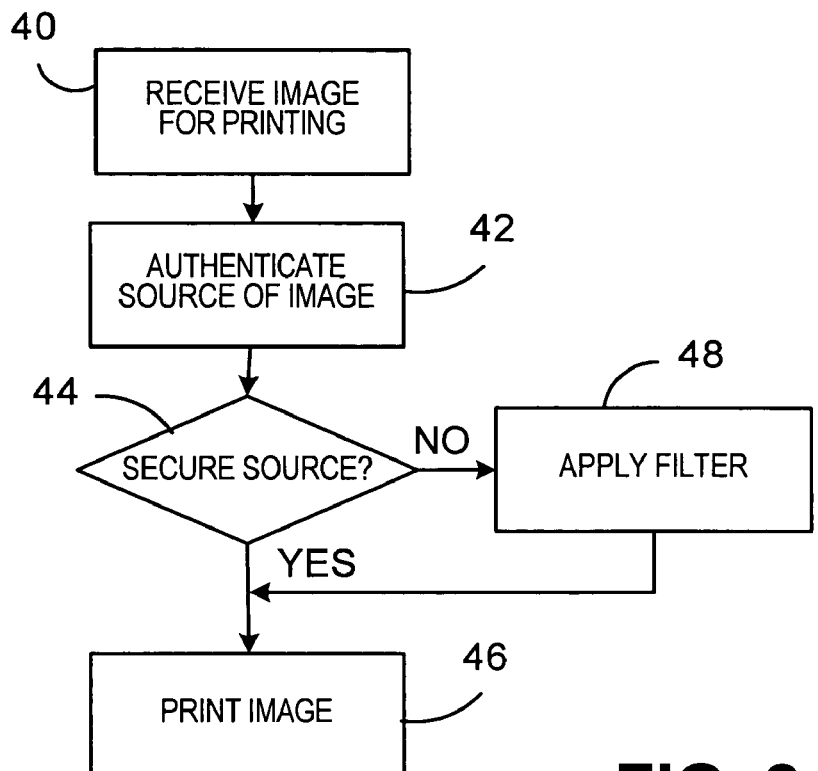
FIG. 2 illustrates in flow diagram form processing performed by the system illustrated in FIG. 1 according to an embodiment of the invention.

The operation of the printing system 10 according to an embodiment of the invention is illustrated in flow chart form in FIG. 2. In the embodiment illustrated in FIG. 2, it is assumed that the graphic security features are included in the image data received from the host application 14. The host application 14 formats image data to send to the printer controller 16 for printing. In step 40, the printer controller 16 receives the image data for printing from the host application. In step 42, the printer controller 16 authenticates the source of the image data that was received from the host application 14 to determine the actual source of the image data. It should be noted that the authenticating step 42 may be optional and need not be performed if so desired. The authentication performed by the printer controller 16 can be done in several different ways. One way is utilizing cryptographic techniques. For example, the data could be cryptographically signed using a cryptographic key, and the digital signature verified by the printer controller 16 utilizing a corresponding key. If the cryptographic signature associated with the image data is verified, the source of the image data is authenticated. Alternatively, a message authentication code (MAC) could be associated with the data and verified by the printer controller 16.

Another way of authenticating the source of the image is using a challenge/response protocol for communications, e.g., mutually authenticated Secure Socket Layer (SSL), between the printer controller 16 and host application 14. Thus, the printer controller 16 can issue a challenge to the host application 14 upon receiving image data, and only if the host application 14 provides the expected response to the challenge will the printer controller 16 deem the source of the image data as authentic. Another way of authenticating the source of the image is by using different communication protocols for communication with different sources. For example, the image data from an authentic source could be provided with a transaction counter and an authorization code. The authorization code could be based on the transaction counter and other secret data shared between the printer 12 and authorized host applications 14. Thus, only if the image data includes the appropriate transaction counter (and not a repeat of a count already processed) and an appropriate authorization number will the printer controller 16 deem the image data as authentic from an authorized source.

The host application 14 could also direct the printer controller 16 to obtain the image data directly from the memory 22. In this situation, since the image data is being retrieved from the internal memory 22 of the printer 12, the printer controller 16 can deem the source of the image data as authentic. It should be noted that while several examples of authentication methods are described above, the present invention is not so limited and any desired method can be utilized to authenticate the source of the image data.

Once the source of the image data has been authenticated (or not) in step 42 (if authentication is being performed), then in step 44 the printer controller 16 will determine if the source is a secure source or non-secure source. A secure source is a source that is known by the printing system 10 to be authorized to generate secure value documents and ensure that proper financial accounting for such secure value documents has properly occurred. A non-secure source is any source that is either unknown to the printer 12 or is not authorized to generate secure value documents. In many situations, the authentication of the source will also result in the determination that the source is a secure source. For example, if the image data is signed with a cryptographic key and the signature verifies, the source is both authenticated and deemed secure. Similarly, if an appropriate challenge/response protocol is utilized, the source would be both authenticated and deemed secure. If the image data is retrieved from the internal memory 22, the source would be deemed secure. In some cases, determination of a source as a secure source could be based on the source being included in a look-up table maintained by the printer 12, or the use of a predetermined communication protocol by the source. Alternatively, the determination of a source as secure or non-secure can be based on authentication of the source. Thus, for example, to determine if a source is secure or non-secure, authentication of the source (as described above with respect to step 42) may be attempted. Typically, if the source is unable to be authenticated, it will be deemed a non-secure source. It should be understood that there may be situations in which even though the source of the image data is authenticated, e.g., known, the printer controller 16 may deem the source to be non-secure. For example, the host application 14 may be a word processing program or the like that while authorized to print using the printer 12, may not be authorized to generate secure value documents.

If in step 44 it is determined by the printer controller 16 that the source of the image data is a secure source, then in step 46 the printer controller 16 will cause the printer to enter into a secure print mode and the printer 12 will print the image as received from the host application 14, including any graphic security features included in the image data. If in step 44 it is determined by the printer controller 16 that the source of the image data is not a secure source, then in step 48 the printer controller 16 will cause the printer 12 to enter into a non-secure print mode and apply a filter to the image data to modify the image data to alter, e.g., degrade or remove, any graphic security features included in the image data. The filter applied by the printer controller 16 can be a traditional image processing filter or simply a different way of processing the image, e.g., a different communication protocol.

The application of a filter by the printer controller 16 to the image data can be done in several different ways. The printer controller 16 can apply a low pass filter to the image data to remove any high frequency components, thereby ensuring that any graphic copy detection features are adequately degraded (or effectively removed) such that they do not reliably reproduce when printed. One method of implementing such a low pass filter is by embedding it in the communication protocol for non-secure images. For example, the protocol for communicating non-secure images may allow for images up to 300 dots per inch (dpi) resolution while secure images would be required to be printed at 600 dpi. Thus, if a graphic security feature or features, intended to be printed at 600 dpi, are printed with a resolution of only 300 dpi, the security features will be degraded to such a point as to be effectively removed from the image. Thus, if the image is an attempt to fraudulently print a value document, the actual printed image will be discernible as fraudulent to verification equipment due to the degradation or absence of the security feature or features. In addition, since the security features are either sufficiently degraded or completely removed in the actual printed image, detection of any copies (e.g., photocopy, scanning, or the like) of the actual printed image is easily accomplished due to the lack of proper security features. The printer controller 16 could also apply a notch filter to the image data to remove a specific range of frequency components from the image, thereby ensuring that the security features will be degraded to such a point as to be effectively removed from the image. One benefit of using a notch filter is that if the bandwidth is narrow enough, the visual degradation of the image to the human eye may be unnoticeable. Thus, while the actual printed image may still look correct to the human eye, the degradation or absence of the security feature or features will be easily detected by verification equipment.

The printer controller 16 can also apply a color depth reduction filter to the image data to reduce the number of colors (or gray scale) in the image data received from a non-secure source. This filter will effectively eliminate any copy detection features that require a large dynamic range of colors. This filter operates similarly to the low pass filter as described above except in the color domain. The printer controller 16 can also apply a color shift filter to the image data to change the relationship between the colors in the image. For example, the contrast levels of grayscale may be distributed along a curve when the image data is from a secure source, while the contrast level in images from non-secure sources may be distributed linearly. Alternatively, black ink may be used when printing image data from a secure source to render black portions of the image while other colors may be mixed to render black portions of an image when printing image data from a non-secure source.

It should be noted that while several examples of the application of a filter to the image data are described above, these are exemplary only and the present invention is not limited only to the illustrated examples, but can utilize any type of filtering that would sufficiently degrade or completely remove any graphic security features included in the image data from the actual printed image. In addition, it should be understood that the printer controller 16 can apply one or more of the filters to the image data as desired. Once the filter (or filters) has been applied to the image, then in step 46 the image data will be printed, without any of the security features included in the image data. Thus, even if the image data from a non-secure source was an exact duplicate of a secure value document, the security features required in the actual printed image will be sufficiently degraded or absent, thereby rendering the printed image detectable as fraudulent as well as any copies of the printed image.

Figure 3:
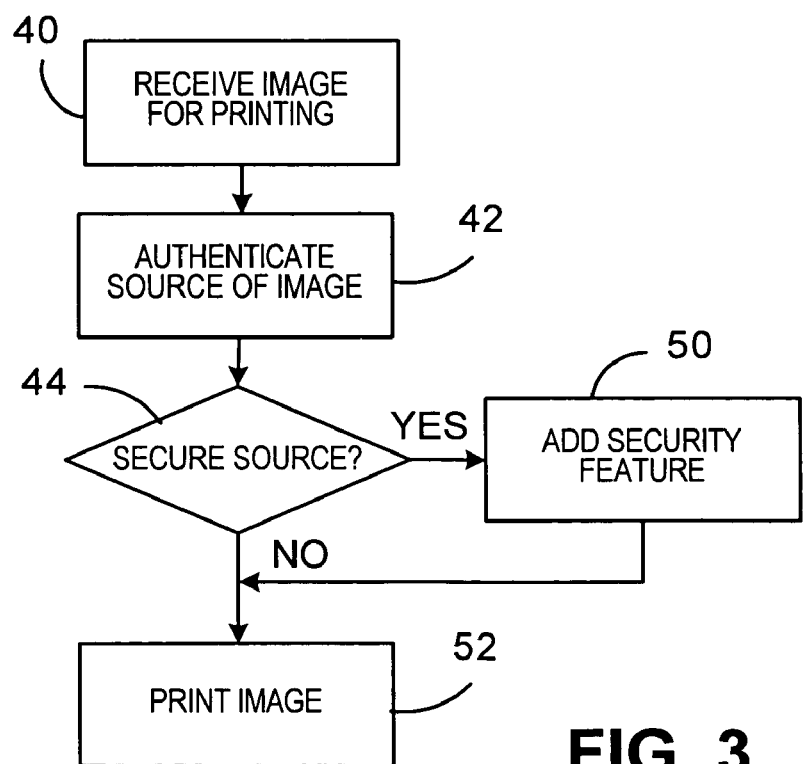
FIG. 3 illustrates in flow diagram form processing performed by the system illustrated in FIG. 1 according to another embodiment of the invention.

The operation of the printing system 10 according to another embodiment of the invention is illustrated in flow chart form in FIG. 3. In the embodiment illustrated in FIG. 3, it is assumed that the graphic security features are not included in the image data received from the host application 14, and the printer 12 is required to add such security features to the image data, when necessary as described below, before printing the image. Steps 40, 42 and 44 are similar as described with respect to FIG. 2, and need not be repeated in detail. Briefly, in step 40, the printer controller 16 receives the image data for printing from the host application; in step 42, the printer controller 16 optionally authenticates the source of the image data that was received from the host application 14; and in step 44 the printer controller 16 will determine if the source is a secure source or not. If in step 44 it is determined by the printer controller 16 that the source of the image data is not a secure source, then in step 52 the printer controller 16 will cause the printer 12 to enter into a non-secure print mode and the printer 12 will print the image as received from the host application 14, e.g., without any graphic security features. If in step 44 it is determined by the printer controller 16 that the source of the image data is a secure source, then in step 50 the printer controller 16 will cause the printer to enter into a secure print mode and modify the image data to add a graphic security feature or features to the image data before the image is printed.

There are several different types of and ways in which security features can be added to the image data. For example, the resolution of the image can be utilized as a security feature as described, for example, in U.S. Pat. Nos. 5,611,630; 6,533,385 and 6,612,684. Changing the resolution of the image can be accomplished, for example, by including instructions in the image data to change the speed of the transport of the medium on which the image is being printed or the rate at which the printing occurs (print strobe timing). This will change the resolution of the image in one direction. The change can be absolute, e.g., images from non-secure sources are printed at 300 dpi, images from secure sources are printed at 307 dpi, or may vary across the image, e.g., images from non-secure sources are printed at 300 dpi, images from secure sources are printed at a resolution that varies from 290 dpi to 310 dpi across a single image. The change in resolution could also be related to data present in the image, such as, for example, the transaction amount of the value document. Another security feature that could be added to the image is the addition of instructions to print a border to at least one side of the image. Preferably, the border would contain a copy detection pattern, and is preferably located in an area that is a non-printable area when printing in the non-secure mode (thereby preventing the border from being printed when the printer 12 is printing in a non-secure mode). Another security feature that could be added to the image is instructions for the printer to physically modify the medium on which the image is being printed. This can be performed, for example, utilizing a punch or knife blade in the printer 12 that marks the surface of the medium during printing. If the print head 20 is a thermal contact print head, the medium can be physically modified by overheating specific elements of the print head 20 to melt the overcoat of the thermal media, utilizing, for example, methods as described in U.S. patent application Ser. No. 10/936, 251, filed on Sep. 8, 2004. Preferably, these physical modifications of the medium vary from image to image based on the content of the image, e.g., transaction amount, date, etc. Other types of security feature that could be added include use of fluorescent inks or watermarks, such as, for example, as described in U.S. Patent Application Publication Nos. 2002/0176114, 2003/0156733, 2005/0087605, 2005/0114668, and 2005/0127187. Another type of security feature includes the use of color gradients as described in U.S. Patent Application Publication No. 2005/0071295. Another type of security feature includes embedding of information in the image such as, for example, as described in U.S. Patent Application Publication No. 2003/0052178.

The addition of a security feature or features to the image data can be done in several different ways. For example, the printer controller 16 can modify the image data that it receives by modifying the data itself and/or sending specific control signals to the print engine 18, e.g., modifying the print resolution for each image or within an image. The security features can also be added by the print engine 18 causing the image to be printed in a non-standard fashion, e.g., printing with the print head 20 at an angle, moving the drive gear axis of the print head 20 slightly off-center to produce non-uniform print resolution, or the like. Security features could also be added by the use of controlled stock when printing in the secure print mode. For example, the paper or label stock (medium upon which the image is to be printed) itself might incorporate security features, e.g., micro-printing. The printer 12 can incorporate sensors 24, such as, for example, optical sensors or the like, that will determine if the proper stock is available for printing. If the proper stock is not sensed during the secure print mode, the printer controller 16 (or print engine 18) will not print the image.

After the security feature (or features) has been added in step 50, then in step 52 the printer 12 will print the image, including the security feature added in step 50. Thus, image data from a non-secure source will not include any security features, thereby enabling detection of a fraudulent secure value document or copies thereof, while image data from secure sources will include the required security features in the actual printed image.

It should be noted that the processing as illustrated in FIGS. 2 and 3 is not mutually exclusive and can be performed in conjunction for each set of image data requested to be printed. Thus, for example, for all image data from a secure source, the printer 12 will add one or more security features to the actual printed image, while for all image data from a non-secure source the printer controller 16 will apply a filter to the image data to remove any security features. This type of processing is preferable if the security feature being added to the image data from a secure source is a watermark, which could be reproducible when the printer 12 is printing in a non-secure mode. Thus, even if image data from a non-secure source includes a watermark, the application of the filter will prevent the watermark from being printed in the actual printed image, thereby rendering the printed images from secure and non-secure sources different.

Figure 4:
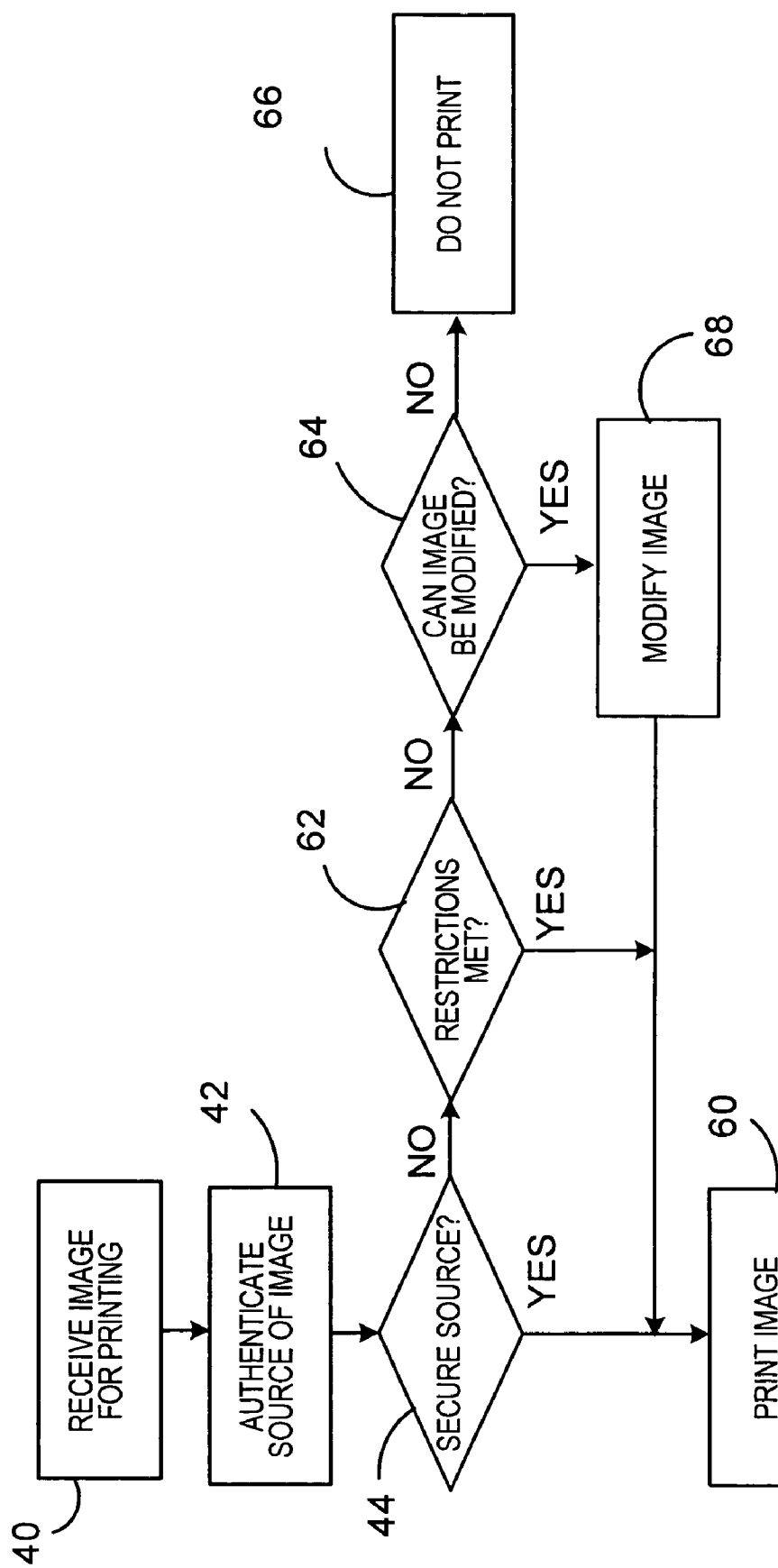
FIG. 4 illustrates in flow diagram form processing performed by the system illustrated in FIG. 1 according to another embodiment of the invention.

The operation of the printing system 10 according to another embodiment of the invention is illustrated in flow chart form in FIG. 4. In this embodiment the printing system 10 preferably checks that an image received for printing from a non-secure source complies with predetermined restrictions placed on such images. The processing performed as illustrated in FIG. 4 can be performed along with or in lieu of the processing as described in FIGS. 2 and/or 3. Steps 40, 42 and 44 are similar as described with respect to FIG. 2, and need not be repeated in detail. Briefly, in step 40, the printer controller 16 receives the image data for printing from the host application; in step 42, the printer controller 16 can optionally authenticate the source of the image data that was received from the host application 14; and in step 44 the printer controller 16 will determine if the source is a secure source or not.

If in step 44 it is determined by the printer controller 16 that the source of the image data is a secure source, then in step 60 the printer controller 16 will cause the printer to enter into a secure print mode and the printer 12 will print the image received from the host application 14. Optionally, one or more security features may be added or removed from the image received from the host application 14 as described with respect to FIGS. 2 and 3. If in step 44 it is determined by the printer controller 16 that the source of the image data is not a secure source, then the printer controller 16 will cause the printer 12 to enter into a non-secure print mode and in step 62 determine if the image data (including the data representative of the image and/or print control instruction data for printing the image) as received complies with one or more pre-determined restrictions placed on images from non-secure sources. One type of restriction, for example, includes dimensional restrictions of the image. Such dimensional restrictions could be stored, for example, in memory 22, and retrieved by the printer controller 16. Typically, images of secure value documents are printed at a fixed size in at least one dimension or within a range of values for that dimension. For example, a postage indicium must be one inch high or between 0.9 and 1.0 inch high. Thus, any images from a non-secure source must not be allowed to replicate these exact dimensions. If the dimensional restriction is a fixed size, e.g., one inch, the printer controller 16 will check to ensure that images from non-secure sources are not approximately one inch, e.g., between 0.95 inches and 1.05 inches high. It is also preferable if the image from a non-secure source is larger than the restricted area to ensure that the image is not simply a copy of a secure value document surrounded by white space.

Another restriction example is the type of stock on which the image will be printed. A sensor 24 in the printer 12 can determine the type of stock that is currently in the printer 12. Stock reserved for printing images received from secure sources can have certain properties, e.g., fluorescence, that can be detected by the sensor 24. The printer 12 will not print images from a non-secure source on the stock reserved for images from a secure source. Another restriction example is the use of a specific ink. Typically, secure value documents are required to be printed with inks having specific characteristics. For example, postage indicia require red fluorescent ink. If the image is from a non-secure source, the printer controller 16 (or print engine 18) will not allow the print head 20 to print the image using the ink supply reserved for images from only secure sources.

If in step 62 it is determined that the image data and/or print instructions for printing the image data as received complies with the pre-determined restrictions placed on images from non-secure sources, then in step 60 the printer 12 will print the image data as received from the host application 14. If in step 62 it is determined that the image data and/or print instructions for printing the image data as received does not comply with one or more pre-determined restrictions placed on images from non-secure sources, then in step 64 the printer controller 16 determines if the image data and/or print instructions can be modified such that the image data and/or print instructions will comply with all of the restrictions. For example, if the dimensional limitations are not met, the printer controller 16 can scale the image to a slightly different size such that it meets the dimensional limitations. If the print instructions requested the ink reserved for only images from a secure source, the printer controller 16 can modify the instructions to use a different ink to print the image. The modifications can also include adding a visual indication to the image data to indicate that the image appears to be an attempt to create a copy of a secure document, e.g., the words "Not Valid Postage" could be added to the image. If the image data and/or instructions for printing the image can be modified to meet all of the restrictions, then in step 68 the image data and/or print instructions are modified such that all restrictions are met, and in step 60 the modified image data is printed or the image data is printed with the modified print instructions. If in step 64 it is determined that the image data and/or print instructions can not be modified such that all restrictions are met, then in step 66 the print controller 16 will cancel the print request for the image, thereby preventing any fraudulent printing of secure value documents from non-secure sources.

Thus, according to the present invention, a printing system is provided in which both secure value documents and non-secure documents from different sources can be printed, while ensuring that fraudulent copies of secure value documents from non-secure sources are not printed and secure value documents from secure sources include copy detection features. Those skilled in the art will also recognize that various modifications can be made without departing from the spirit of the present invention. For example, security features could be added to every image printed by the printer 12, with different security features being added to images from secure sources as compared with images from non-secure sources. Thus, based on the security feature included in the printed image, it can be determined if the actual printed image is a legitimate secure value document or a fraudulent copy.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a printing system to print an image based on image data received from a source comprising:
    determining if the source is a secure or non-secure source;
    if the source is determined to be a secure source, printing the image using the image data as received;
    if the source is determined to be a non-secure source, determining if the image data complies with a predetermined restriction for image data received from a non-secure source; and
if the image data complies with the predetermined restriction, printing the image using the image data as received.

2. The method of claim 1, wherein if the image data does not comply with the predetermined restriction, the method further comprises:
    determining if the image data can be modified and such that the image data will comply with the predetermined restriction; and
    if the image data can not be modified such that it will comply with the predetermined restriction, canceling printing of the image.

3. The method according to claim 2, wherein if the image data can be modified such that it will comply with the predetermined restriction, the method further comprises:
    modifying the image data such that it will comply with the predetermined restriction; and
    printing the image using the modified image data.

4. The method according to claim 3, wherein the predetermined restriction includes a dimensional restriction, and modifying the image data further comprises:
    modifying the image data to change a scale of the image such that the dimensional restriction is met.

5. The method according to claim 3, wherein the predetermined restriction includes a type of ink with which the image can be printed, and modifying the image data further comprises:
    changing to a different type of ink to print the image.

6. The method according to claim 1, wherein the predetermined restriction includes a dimensional restriction.

7. The method according to claim 1, wherein the predetermined restriction includes a type of medium upon which the image can be printed.

8. The method according to claim 1, wherein the predetermined restriction includes a type of ink with which the image can be printed.

* * * * *